United States Patent
Woodgate et al.

(10) Patent No.: US 9,795,992 B2
(45) Date of Patent: Oct. 24, 2017

(54) SCREEN PANEL FIXING SYSTEM AND METHODS

(71) Applicant: Lettela Pty Limited, Airport West (AU)

(72) Inventors: Marc Raymond Woodgate, Bacchus Marsh (AU); Raymond Maxwell Woodgate, Bacchus Marsh (AU)

(73) Assignee: Lettela Pty Limited, Airport West (AU)

( * ) Notice: Subject to any disclaimer, the term of this patent is extended or adjusted under 35 U.S.C. 154(b) by 0 days.

(21) Appl. No.: 14/944,631

(22) Filed: Nov. 18, 2015

(65) Prior Publication Data
US 2016/0136690 A1    May 19, 2016

(30) Foreign Application Priority Data
Nov. 18, 2014  (AU) ................................ 2014904625

(51) Int. Cl.
*B07B 1/46*  (2006.01)
*F16B 5/00*  (2006.01)

(52) U.S. Cl.
CPC .............. *B07B 1/46* (2013.01); *B07B 1/4645* (2013.01); *F16B 5/0032* (2013.01)

(58) Field of Classification Search
CPC .... B07B 1/00; B07B 1/28; B07B 1/46; B07B 1/4609; B07B 1/4645
USPC ........................................ 209/363, 405, 408
See application file for complete search history.

(56) References Cited

U.S. PATENT DOCUMENTS

| | | | | |
|---|---|---|---|---|
| 4,840,728 A | * | 6/1989 | Connolly | ................... B07B 1/46 209/397 |
| 5,277,319 A | * | 1/1994 | Henry, Jr. | ................. B07B 1/46 209/399 |
| 5,377,846 A | * | 1/1995 | Askew | ....................... E04C 2/42 209/399 |

(Continued)

FOREIGN PATENT DOCUMENTS

AU           577767       9/1988
AU      2012211453 B2    2/2013

*Primary Examiner* — Terrell Matthews
(74) *Attorney, Agent, or Firm* — Walter | Haverfield LLP; D. Peter Hochberg; Sean F. Mellino

(57) ABSTRACT

A screening apparatus 10, including a plurality of elongate beams 11, a plurality of screen panels 14 mounted to the beams to form a broad screening surface, each of the panels 14 being generally square or rectangular and the panels 14 being mounted adjacent to each other so that facing side edges of adjacent panels 14 are in close facing relationship. Each panel 14 being mounted to a pair of beams 11 along opposite side edges to bridge between two adjacent beams 11. The panels 14 being mounted to the beams 11 by elongate fixing members 13 that extend in the longitudinal direction of the beams 11 and that are fixed to an edge of the beams 11 and that engage opposite side edges of the panels 14. The fixing members 13 are fixed to the edges of the beams 11 by projections 24, 25 that are spaced apart longitudinally of the fixing members 13 and that extend into openings 18, 19 provided in the edge of the beams 11. The projections 24, 25 being releasably connected to the openings 18, 19 in the beams 11 and extending out of the openings 18, 19 and into releasable connection with the fixing members 13.

18 Claims, 4 Drawing Sheets

(56) References Cited

U.S. PATENT DOCUMENTS

| | | | | |
|---|---|---|---|---|
| 5,398,817 A * | 3/1995 | Connolly | ............ | B07B 1/46 |
| | | | | 209/399 |
| 6,957,741 B2 * | 10/2005 | Freissle | ............ | B07B 1/46 |
| | | | | 209/405 |
| 8,720,697 B2 * | 5/2014 | Pryde | ............ | B07B 1/4645 |
| | | | | 209/399 |
| 2015/0290682 A1 * | 10/2015 | Paul | ............ | B07B 1/4645 |
| | | | | 209/405 |

* cited by examiner

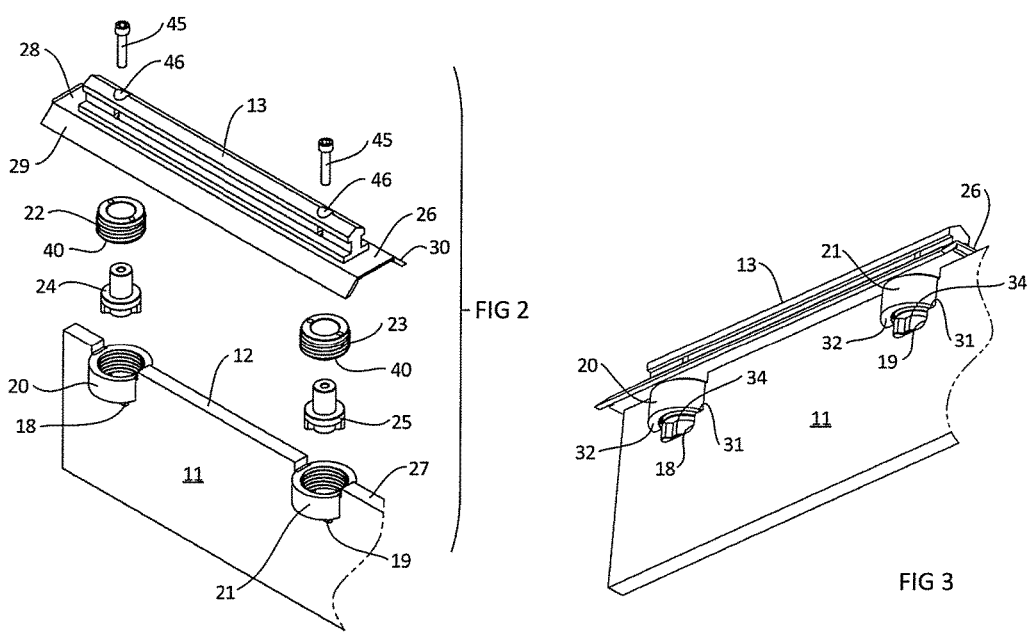

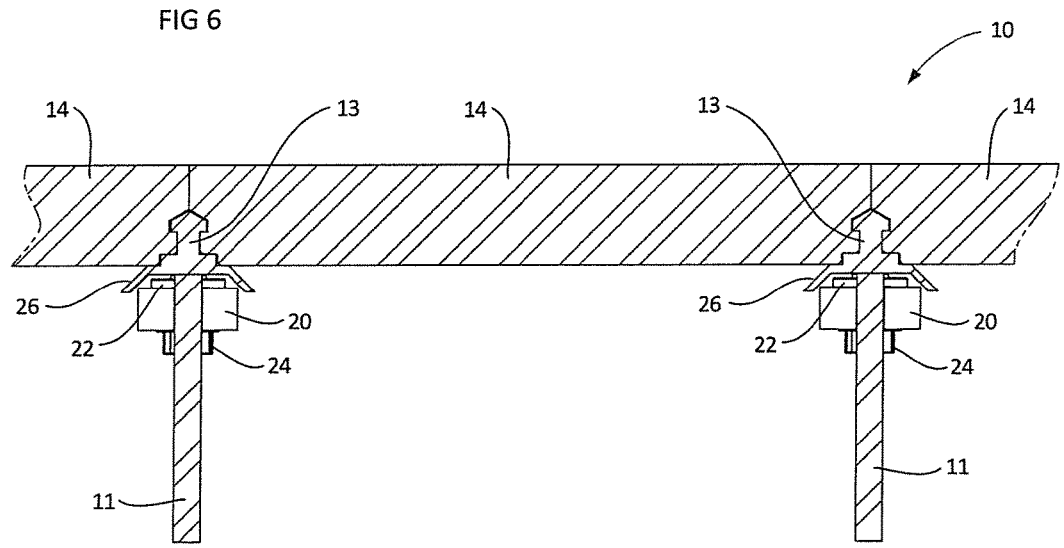

SCREEN PANEL FIXING SYSTEM AND METHODS

TECHNICAL FIELD

The present invention relates generally to apparatus for screening, separating or grading materials, principally for use in the mining industry. The present invention is particularly directed to arrangements for fixing screen panels to the support frame of a vibratory screening machine. The system is applicable for screening, separating and grading ores and other materials, and it will be convenient to hereinafter describe the invention in relation to that use. It is to be appreciated, however, that the invention is not limited to such apparatus and use.

BACKGROUND OF INVENTION

The following discussion of the background to the invention is intended to facilitate an understanding of the invention. However, it should be appreciated that the discussion is not an acknowledgement or admission that any of the material referred to was published, known or part of the common general knowledge as at the priority date of the application.

Screening apparatus of the type with which the invention is concerned is generally used for screening, grading, or separating materials such as ores and comprises an array of screen panels which are removably fixed to a frame to provide a continuous screen deck. The material to be screened is fed onto the deck at one end and the apparatus is vibrated so that the material moves over and through its screening surface. Some material passes through the panels of the screen deck and is collected below the screen deck. Other material is too large to pass through the panels and remains on top of the screen deck and is collected at the end of the screen deck. That material is kept separate from the material that passes through the screen deck.

One form of screen panel includes a steel frame moulded within a resilient plastic material, such as polyurethane. See for example Australian Patent No. 577767 (66006/86). The plastic moulding forms the major part of the panel and it is in the plastic moulding that the openings for screening are provided.

The screen panels in a screen deck are usually subject to wear, due to the abrasiveness of the mining materials typically being screened, and thus the screens require periodical replacement. This presents a difficulty with the attachment of the panels to the deck frame, as the attachment must be secure and robust, but should also be releasable in a manner that is quick and easy.

The frame to which screen panels in a screen deck are secured usually comprises a framework of elongate beams. The beams can be of various section, but the present invention has been developed for the connection of the screen panels to a top or upstanding edge of a beam.

Applicant has already developed one screen panel fixing system for connecting screen panels to a top or upstanding edge of a beam. That system is described in Australian Patent 2012211453. The system of the present invention is an alternative to the system disclosed in patent 2012211453.

SUMMARY OF INVENTION

In one form of the invention, there is provided a screening apparatus, including:

a plurality of spaced apart, substantially parallel elongate beams, a plurality of screen panels mounted to the beams to form a broad screening surface, each of the panels being generally square or rectangular to define four side edges and the panels being mounted adjacent to each other so that facing side edges of adjacent panels are in close facing relationship, each panel being mounted to a pair of beams along opposite side edges to bridge between two adjacent beams, the panels being mounted to the beams by elongate fixing members that extend in the longitudinal direction of the beams and that are fixed to an edge of the beams and that engage opposite side edges of the panels, the fixing members being fixed to the edges of the beams by projections that are spaced apart longitudinally of the fixing members and that extend into openings provided in the edge of the beams, the projections being releasably connected to the openings in the beam and extending out of the openings and into releasable connection with the fixing members.

Preferably, the releasable connection between the fixing members and the projections is a screw threaded connection, whereby a screw extends through the fixing member and into threaded connection with the projection. This advantageously facilitates simple installation using readily available equipment (a screw driver or drill) to fix the fixing rails to the projection and thus to the beam. Also, the screw fastener is installed from above the fixing member and that can provide advantages over Applicant's previous arrangement disclosed in Australian Patent 2012211453.

Like Applicant's previous arrangement disclosed in Australian Patent 2012211453, the present invention provides a system for connecting fixing members to an upper edge of supporting beams that form part of a screening deck. This system can be used with beams of any cross section that present an upper edge for connection of the fixing members. In most cases, the beams will be planar beams, which extend in a single plane only and these are known in the industry sometimes as "stringers".

In addition and again like Applicant's previous arrangement disclosed in Australian Patent 2012211453, openings in the beams into which the projections extend can be of a greater diameter than the outside diameter of the projections, so that the projections are a loose fit within the openings. This allows limited movement of the projections relative to or within the openings so that the fixing members and the screen panels can be moved relative to or on the beams before the projections are fixed in place relative to the openings.

The present invention advantageously provides a relatively simple method of connection between the fixing members and the elongate beams, while it also allows for ease in removal of the fixing members when required. The releasable connection between the fixing members and the projections allows the fixing members to be released from the beams without also requiring the projections to be released from the openings in the beams. Thus, the projections can remain in place on the beams even though the fixing members are released from the beams. This means that the fixing members can be removed and replaced relatively easily, and this might occur for example, if the fixing members are damaged or worn. Damage can occur in some circumstances by the screening media, or the fixing members can be damaged when panels are being removed or inserted. In general, damage or wear of a fixing member occurs infrequently, and therefore the need for removing a member is not regular, but when it occurs, it is desirable that removal be made quickly and easily.

The invention also provides benefits for the installation of fixing members, by enabling the fixing member a relatively small amount of movement on the beam to which it is fixed so that screen panels can be accurately aligned to form a continuous screening surface. In particular, by the employment of openings into which the projections extend that are either of greater diameter than the outside diameter of the projections, or which are otherwise a loose fit about the projections, the panels that are fixed to the fixing members on the beams can be shifted a small amount on the supporting deck. Thus, any misalignment between adjacent screening panels can be corrected. The amount of shifting movement need only be minor, as the initial accuracy of positioning of the panels on the screening deck is usually quite good. The shifting movement is generally required to correct small misalignment to ensure that faces of adjacent screening panels that are intended to engage, engage properly.

The shifting movement of the present invention is not available in some prior art decks, in which the panels are fixed in place once they are fixed to the beams. In those prior art decks, any inaccuracy in the fixing arrangements employed with the panels can leave gaps between the panels. This can result in inefficient performance of a screening deck by allowing screening material to pass through gaps within the deck surface with that material being larger than the screened material is intended to be. There can also be an effect on the structural integrity of the screen deck through the misalignment of the screening panels.

The passage of material through gaps between adjacent panels can also allow fine material to enter spaces where it causes wear of the screen panels, the fixing members, the beam or other connection components between the screen panels and the beam, or parts of the screening apparatus. Thus, accurate positioning of the screen panels to prevent or minimise gaps between screen panels is highly beneficial and is facilitated by the provision of openings of greater diameter than the outside diameter of the projections, so that the projections are a loose fit within the openings.

The amount of movement of the panels on the beams can be within the range of between 0-8 mm. Advantageously, by providing round openings in the edge of the beams, the movement can be in any direction. Alternatively, the openings could be formed other than round, such as in the form of elongate slots, if alternative or greater movement in a particular direction is required. In this latter form of the invention, a slot which allows movement perpendicular to the lengthwise extent of the beams could be provided within one range and movement longitudinally of the beams could be provided in a different range. Thus, the invention provides flexibility to provide different levels and directions of movement of the fixing members relative to the beams as considered suitable for the particular screening deck being manufactured.

The openings provided in the edge of the beams can be provided in any suitable form. In some forms of the invention, annular rings are provided to form the openings and those rings are fitted to the edge of the beams. The annular rings can be circular but this is not essential. In some forms of the invention, the rings are fitted into slots which are formed in the edge of the beams. The slots can be any suitable shape such as square or rectangular. The annular rings can be welded into the slots.

The slots can be of any suitable depth to receive the annular rings. The slots can be of a depth that annular rings can project out of the slots. This can mean that the annular rings project above the edge of the beam in which the slots are formed. Alternatively, the slots can be of a depth so that the upper edge of the annular rings is at the same level as the edge of the beam in which the slots are formed, or is below the edge.

The slots can be stepped so that a bottom edge of the annular rings can rest on a step or ledge and the slots extend below the step or ledge. This arrangement can be provided so that the annular rings can be seated on the step or ledge prior to being fixed into the slot, such as by welding. This can assist to accurately locate the annular rings within the slot. This is important to ensure that the projection is accurately aligned for releasable fixing to a fixing member. If the annular rings are not accurately fixed in place, then the projection might not align accurately with fixing member and this can affect the proper alignment of the fixing member and a screen panel that is fixed to it.

In the above arrangement in which the slots extend below the bottom edge of the annular rings to form a bottom section, the projection can extend into the bottom section of the slot for fixing by the annular ring. In these forms of the invention, the bottom surface of the projection can seat on the bottom surface of the bottom section. This has been found to provide benefits in accurately aligning the projection for connection to the fixing member. It has been found that the fabrication of the beams can be very accurate. Often the beams are laser cut to form the various openings and fixtures they require and the nature of laser cutting means the openings and fixtures are very accurately positioned. Thus, it has been found that by seating the bottom surface of the projection on the bottom surface of the bottom section of a slot, the projection can be accurately positioned and in particular, the projections can be positioned to provide a constant or consistent working height over the length of the beam. This differs from prior art arrangements in which the annular rings form the datum from which the fixing members are located and often they can be misaligned, during the welding process and then the fixing members can be inaccurately positioned. Accordingly, by locating the projections in this manner, the accuracy of the annular rings that the projections are fitted into is not as critical. This is beneficial, because the act of welding the annular rings into position can often disturb the accuracy with which the rings are positioned even if the rings are supported as mentioned earlier on stepped sections of the slots.

It is to be appreciated that the bottom surface of the projections can be seated on the bottom surface of a slot which is not formed in a stepped configuration to have a bottom section. The projections can be seated on any suitable surface of a slot or indeed any suitable surface of a beam, given that it is the accuracy of the beam configuration that is being employed to accurately position the projections.

In some forms of the invention, the annular ring can be internally threaded and the projections can thread into the annular rings for releasable connection to the annular rings. In other forms of the invention, where movement of the fixing members relative to the beams is to be provided, the projections can be inserted into the annular rings loosely and a threaded collar or sleeve can engage the internal thread of the annular rings to fix the projections within the annular rings. The collar or sleeve can bear against a surface of the projection to prevent its release from the annular ring, but the projection can otherwise be allowed limited shifting movement within the annular ring.

In the above arrangement, the collar or sleeve can bear downwardly against a surface of the projection to prevent its release from the annular ring, and the bearing engagement can be flat or planar surface engagement that allows the projection to shift relative to the collar or sleeve upon a load being applied to overcome the friction between the projection and the collar or sleeve. Movement could be promoted by knocking the fixing member that is connected to the projection with a hammer or mallet or the like. This is envisaged to provide enough force to shift the projection relative to the collar or sleeve to provide for alignment of slightly misaligned panels.

It is to be appreciated that where threaded engagement between the annular rings and the projection or the collar or sleeve has been described, other forms of connection can be made, including bayonet fit and snap fit.

In forms of the invention in which a bottom portion of the projection extends into the bottom section of the slot, and the projection is a loose fit within the annular ring, the bottom portion can include an abutment or abutments to engage a wall of the slot or the beam to prevent rotation of the projection. This might be beneficial or necessary for example, in arrangements which employ a screw fastener to secure the fixing member to the projection, whereby rotation of the screw fastener will tend to rotate the projection. Thus, the projection can rotate until the abutment engages against the wall and thereafter, further rotation is prevented. This can be important depending on the type of releasable connection that is made between the projection and the fixing member.

The projection can connect to the fixing member in any suitable manner. In one form of the invention, a screw fastener can be inserted through openings in the fixing member and into a threaded opening in the projection. The opening could even be non-threaded if a self-threading screw was used. The use of screw fasteners provides for quick and easy fixing of the fixing member to the projections and does not require specific skills or equipment. Also, the removal of a fixing member is as easy as installing a fixing member.

In order that the invention may be more fully understood, some embodiments will now be described with reference to the figures in which:

BRIEF DESCRIPTION OF DRAWINGS

FIG. 2 is an exploded view of one portion of a beam of the screening deck of FIG. 1, showing the components for fixing a fixing member to the beam.

FIG. 3 is an underneath perspective view of the assembly of FIG. 2 in an assembled condition.

FIG. 6 is a cross sectional view through a pair of the beams and screen panels illustrated in FIG. 1.

DETAILED DESCRIPTION

Figure 1:
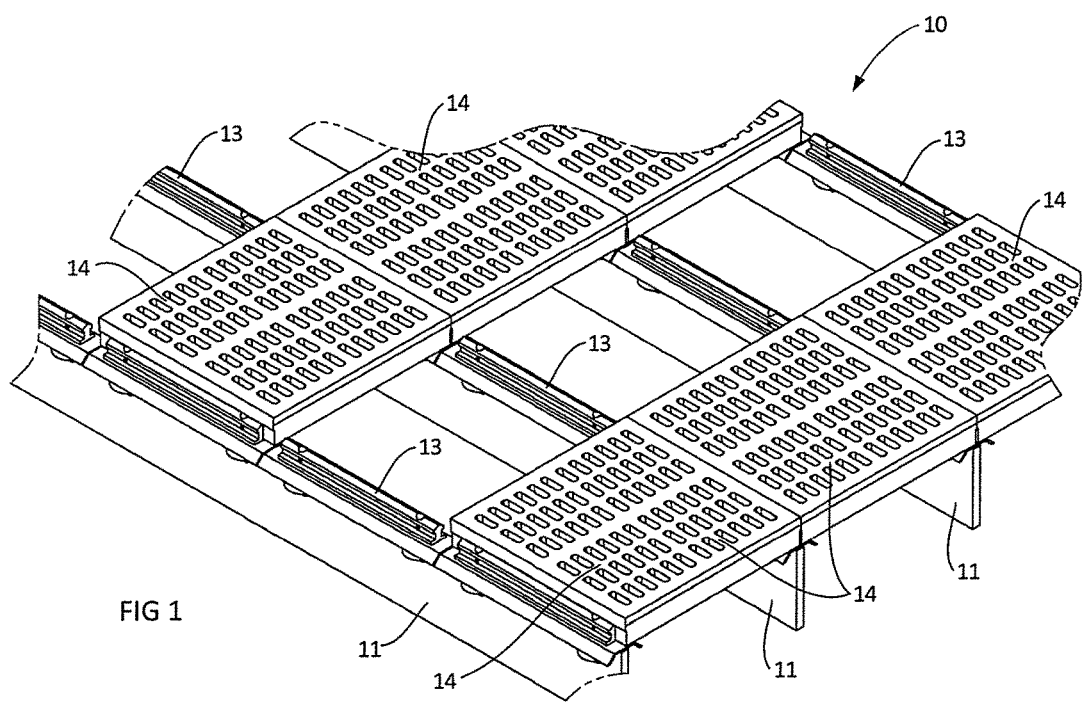
FIG. 1 illustrates a portion of a screening deck according to one embodiment of the invention.

With reference to FIG. 1, a portion of a screening deck 10 is illustrated comprising a plurality of elongate, longitudinal beams 11 each of which is formed from a planar beam section, sometimes known as a "stringer". Each of the beams 11 extends in the longitudinal direction of the screening deck 10 although the beams can equally extend in a direction perpendicular to the direction of the beams 11 as illustrated.

The deck 10 illustrated in FIG. 1 is a portion of a deck only and does not include side edge beams that define the edge of the deck and other components of the deck. These are not necessary to understand the operation of the present invention.

The beams 11 extend parallel to one another and present an upper edge 12 (see FIG. 2) to which a plurality of fixing members 13 are fixed to support the screen panels 14.

As indicated above, the screening deck 10 is one part of an overall screening apparatus. In practice, the deck 10 is supported on a frame and in use, the entire apparatus is vibrated so that the screen deck 10 vibrates. Openings or apertures in the screen panels 14 allow certain sizes of screening material to fall through and other sizes to remain on top of the deck. Ultimately, the aim of the screening exercise might be to collect the screened material which passes through the panels 14, or the material which remains on top of the panels 14, or both. The process is normally adopted in the mining industry either to separate or sift mined ore, or to size or grade such ore.

FIG. 1 shows several portions of the deck 10 that do not have panels installed. Those portions without panels are intended to illustrate the fixing members 13 that are applied to the edges 12 of the beams 11 shown in FIG. 2. In addition, those portions show how the screen panels 14 are connected along opposite edges to the fixing members 13.

The screen panels 14 form a screening deck in which facing side edges of adjacent panels are in close facing relationship, or most preferably, are in abutting engagement. By this latter arrangement, the screen panel can be assembled so that it does not include gaps between adjacent panels, which can otherwise allow ingress of screening material between panels rather than just through the openings of the screen panels. If that ingress occurs, the screening material can come into contact with components of the screen deck during vibration and can damage or wear those components prematurely. In addition, material that enters any gaps between adjacent panels might pass through the screening deck even though it is oversized relative to the openings in the screen panels and this can compromise the screened material.

It will be evident from the discussion which follows, that the ease and accuracy of fitting between adjacent panels is enhanced by the present invention.

With reference to FIG. 2, an exploded version of a portion of the screening deck 10 is illustrated, showing a portion of a beam 11 and a single fixing member 13 that is to be releasably connected to the beam 11.

The beam 11 includes slots 18 and 19 into which annular rings 20 and 21 are fixed, most likely by welding. The rings 20 and 21 are each internally threaded for receipt of an externally threaded collar or sleeve 22 and 23 (hereinafter referred to as a "sleeve"). The annular rings 20 and 21 are also provided for receipt of projections 24 and 25.

The fixing member 13 is shown paired with a deflector 26. With the arrangement of FIG. 2 fully assembled as shown in FIG. 1, the deflector 26 sits against the upper surface 27 of the edge 12 and the purpose of the deflector is to deflect any material that might pass between adjacent screen panels 14 at the junction of the fixing member 13, away from the upper surface 27, so that the material does not collect between the upper surface 27 and the facing surface of the fixing member 13 and cause wear between those parts. The deflector 26 includes a base 28 on which the fixing member 13 rests, and a pair of inclined deflector sides 29 and 30.

Assembly of the components of the screening deck 10 shown in FIG. 2 firstly involves forming the beam 11 with the slots 18 and 19 and welding or otherwise fixing the annular rings 20 and 21 within the slots 18 and 19. FIG. 3 is an underneath view of the assembled arrangement of FIG. 2 and shows that the slots 18 and 19 are stepped to form a ledge 31 on which a bottom edge 32 of the rings 20 and 21 rest for accurate location within the slots 18 and 19 prior to welding. The rings 20 and 21 rest on the ledge 31 prior to welding which supports the rings as they are being welded against movement that would misalign the rings.

Returning to FIG. 2, with the rings 20 and 21 welded into the slots 18 and 19, the projections 24 and 25 are inserted into the rings 20 and 21 and in the arrangement illustrated, a bottom portion of the projections 24 and 25 extends into a bottom section of the slots 18 and 19 below the ledges 31.

The bottom surface 33 of the projections 24 and 25 can seat on the bottom surface 34 of the slots 18 and 19. This can accurately aligning the projections 24 and 25 for connection to the fixing member 13. This is because the fabrication of the slots 18 and 19 of the beams 11 can be very accurate. By seating the bottom surface 33 of the projections 24 and 25 on the bottom surface 34 of the slots 18 and 19 the projections 24 and 25 can be accurately positioned.

Figure 4:
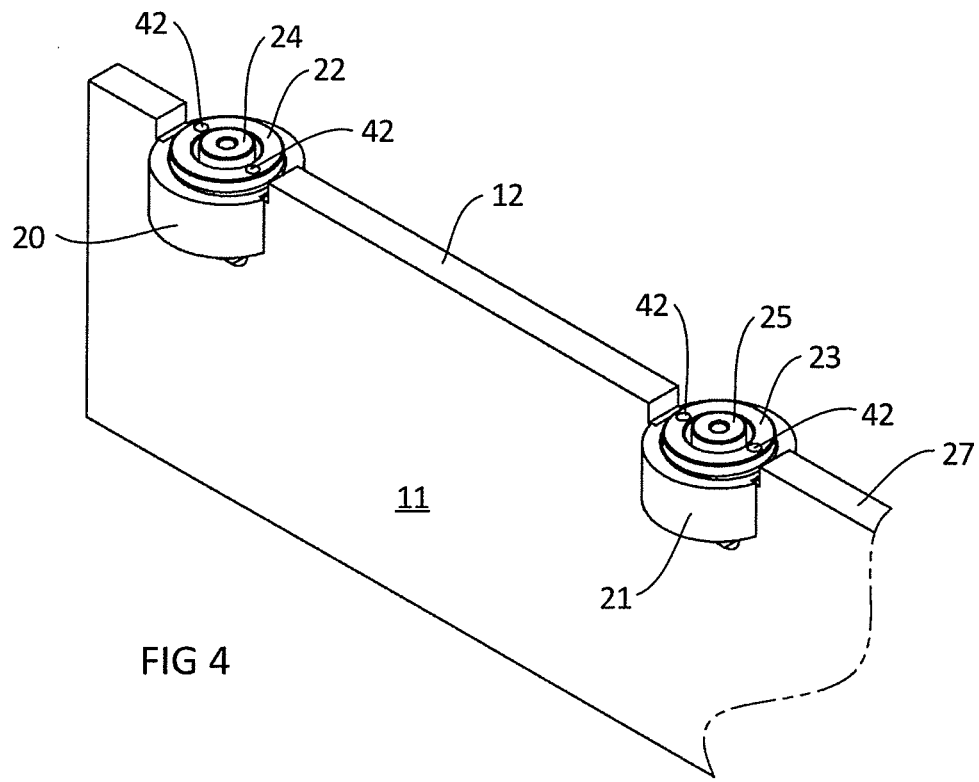
FIG. 4 is a top perspective view showing several of the components illustrated in FIG. 2 in an assembled condition.

Following insertion of the projections 24 and 25 into the annular rings 20 and 21, the sleeves 22 and 23 can be threaded into the rings 20 and 21 to lock the projections 24 and 25 in place. This view is shown in FIG. 4. The interaction between the projections 24 and 25, the annular rings 20 and 21 and the sleeves 22 and 23 is such as to prevent vertical movement of the projections 24 and 25 relative to the rings 20 and 21, but is intended to allow slight horizontal movement for adjustment purposes.

Figure 5:
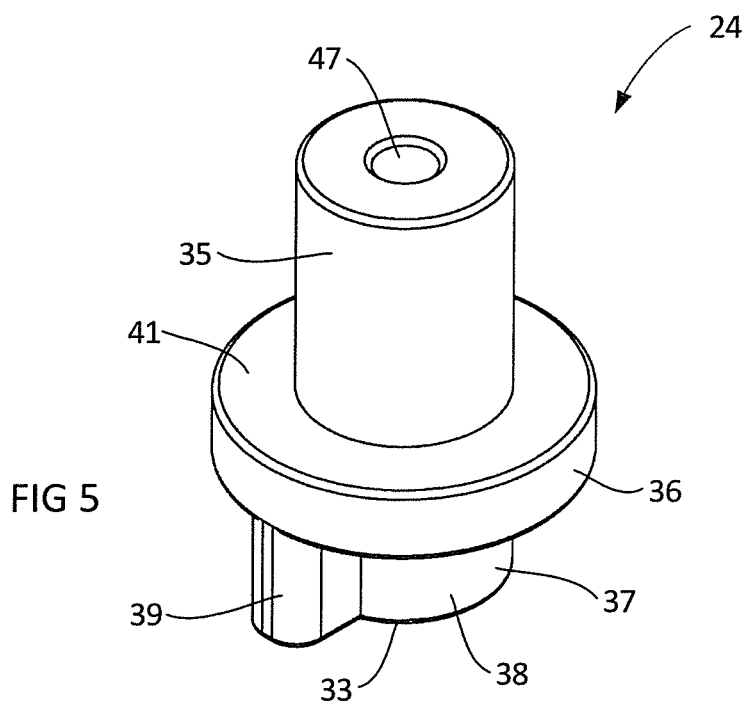
FIG. 5 is a perspective view of a projection according to the invention.

With reference to FIG. 5, the projection 24 (which is identical to the projection 25), is illustrated alone and it can be seen that the projection comprises a central post 35, a flange or skirt (hereinafter "skirt") 36 and a base 37 which comprises a central portion 38 and an abutment portion 39.

In the arrangement illustrated in FIGS. 3 and 4, the base 37 extends into the bottom portion of the slots 18 and 19 below the ledge 31 and the bottom surface 33 of the base 37 seats on the bottom surface 34 of the slots 18 and 19. The skirt 36 is positioned within the rings 20 and 21, although it can be either partially or fully within the rings 20 and 21. It is the base surface 40 (see FIG. 2) of the sleeves 22 and 23 which bears against the upwardly facing surface 41 of the skirt 36 and retains the projection within the rings 20 and 21. This is firm engagement between the rings 20 and 21 and the projections 24 and 25 and the engagement is on substantially flat or planar facing surfaces. This allows later relative shifting movement between the rings and the projections for alignment purposes with respect to the fixing members and the screen panels attached to them.

The sleeves 22 and 23 each include openings 42 (see FIG. 4) for engagement by a suitable tool to tighten the sleeves 22 and 23 within the rings 20 and 21.

With the components assembled as shown in FIG. 4, it is then possible to fix the deflector 26 and the fixing member 13 to the beam 11. Both the deflector 26 and the fixing member 13 are lowered onto the upper edge 12 of the beam 11 and thereafter, screw fasteners 45 (see FIG. 2) are driven through openings 46 in the fixing member 13 and aligned openings (not shown) in the deflector 26 and into the central openings 47 (see FIG. 5) in the projections 24 and 25. The opening 47 can be threaded to mate with the threaded fastener 45, or the fasteners 45 can be a self-threading fastener. The fixing members can include an elongate reinforcing member through which the screw fasteners extend.

The purpose of the abutment portion 39 of the projections 24 and 25 will now become evident, given that as the screw fasteners 45 are rotated to engage the projections 24 and 25 there is a tendency for the projections 24 and 25 to rotate. Accordingly, if that rotation occurs, the abutment portion 39 will rotate into engagement with the side edge of the slots 18 and 19 to prevent further rotation. The screw fasteners 45 can thereafter drive into the opening 47 and firmly fix the fixing member 13 and deflector 26 in place relative to the edge 12 of the beam 11.

With the fixing rails 13 fixed to the beams 11 by the assembly method discussed above, the screen panels 14 can be connected to the fixing rails along opposite side edges and in cross sectional view, FIG. 6 shows a pair of adjacent beams with the assembly of FIG. 2 in place and with one screen panel 14 shown in full and end sections of two adjacent panels 14. It can be seen from FIG. 6, that side edges of the panels 14 include a profile suitable to receive the fixing member 13 and the shape of the fixing member and the complementary edge profiles of the screen panels 14 are such as to lock the edges of the screen panels 14 to the fixing members 13.

The arrangement illustrated in the figures is relative easy to install, and requires little in the way of skill or special equipment. Moreover, the projections 24 and 25 can be a loose fit within the rings 20 and 21, so that there can be adjustment of the screen panels for accurate alignment.

A benefit of the illustrated arrangement is that the fixing members 13 can be attached to the beams 11 by installation personal that operate above the beams 11, so that no side access or below deck access is required.

Throughout the description and claims of this specification the word "comprise" and variations of that word, such as "comprises" and "comprising", are not intended to exclude other additives, components, integers or steps.

The invention described herein is susceptible to variations, modifications and/or additions other than those specifically described and it is to be understood that the invention includes all such variations, modifications and/or additions which fall within the spirit and scope of the present disclosure.

The claims defining the invention are as follows:

1. A screening apparatus, including:
   a plurality of spaced apart, substantially parallel elongate beams;
   a plurality of screen panels mounted to the beams to form a broad screening surface, each of the panels being generally square or rectangular to define four side edges and the panels being mounted adjacent to each other so that facing side edges of adjacent panels are in close facing relationship, each panel being mounted to a pair of beams along opposite side edges to bridge between two adjacent beams;
   elongate fixing members for mounting the panels to the beams, wherein the elongate fixing members extend in a longitudinal direction of the beams and are fixed to an edge of the beams and engage opposite side edges of the panels; and
   projections for fixing the fixing members to the edges of the beams, wherein the projections are spaced apart longitudinally of the fixing members and extend into openings provided in the edge of the beams, the openings being provided in annular rings which are fitted into slots that are formed in the edge of the beams, the slots including a step on which a bottom edge of the annular rings rests, the step defining a junction between top and bottom slot sections and each of the bottom slot section and the projections having a bottom surface, whereby the bottom surface of the projection seats on the bottom surface of the bottom slot section, the projections being releasably connected to the annular rings and extending out of the annular rings and into releasable connection with the fixing members.

2. A screening apparatus according to claim 1, wherein the releasable connection between the fixing members and the projections is a screw threaded connection, whereby a screw fastener extends through the fixing member and into threaded connection with the projection.

3. A screening apparatus according to claim 2, wherein the fixing members include a web which extends between a head and a base, and wherein the fixing members define a recess on each side of the web between the head and the base, the screw fastener extending through each of the head, the web and the base of the respective fixing member.

4. A screening apparatus according to claim 3, wherein the screw fastener is countersunk into the head of the fixing member so that the screw fastener does not project from the head.

5. A screening apparatus according to claim 2, wherein the fixing members include a reinforcing strip extending lengthwise of the fixing members and the screw fasteners extend through the reinforcing strip.

6. A screening apparatus according to claim 1, wherein the openings provided in the edge of the beams are provided in annular rings which are fitted to the edge of the beams and which are internally threaded.

7. A screening apparatus according to claim 1, wherein the annular rings are internally threaded.

8. A screening apparatus according to claim 6, further including threaded collars which threadably engage the internal thread of the annular rings and which engage the projections to releasably connect the projections within the annular rings.

9. A screening apparatus according to claim 8, wherein the engagement between the projections and the collars is a bearing engagement between facing flat or planar surfaces of the projections and collars.

10. A screening apparatus according to claim 9, wherein the projections include a flange or skirt that is engaged by a bottom surface of the collars.

11. A screening apparatus according to claim 1, wherein the annular rings are internally threaded, and wherein threaded collars threadably engage the internal thread of the annular rings, a portion of the projections being sandwiched between the bottom surface of the bottom slot section and the collars to releasably connect the projections within the annular rings.

12. A screening apparatus according to claim 1, wherein the projections include an abutment for abutting a proximate surface of the screening apparatus and for preventing rotation of the projections.

13. A screening apparatus according to claim 7, wherein the projections threadably engage the internal thread of the annular rings for releasable connection of the projections to the annular rings.

14. A screening apparatus, including:
a plurality of spaced apart, substantially parallel elongate beams;
a plurality of screen panels mounted to the beams to form a broad screening surface, each of the panels being generally square or rectangular to define four side edges and the panels being mounted adjacent to each other so that facing side edges of adjacent panels are in close facing relationship, each panel being mounted to a pair of beams along opposite side edges to bridge between two adjacent beams,
elongate fixing members for mounting the panels to the beams, wherein the elongate fixing members extend in a longitudinal direction of the beams and are fixed to an edge of the beams and engage opposite side edges of the panels;
projections for fixing the fixing members to the edges of the beams, wherein the projections are spaced apart longitudinally of the fixing members and extend into openings provided in the edge of the beams, the openings being provided in annular rings which are fitted to the edge of the beams and which are internally threaded, the annular rings being fitted into slots that are formed in the edge of the beams, the slots including a step on which a bottom edge of the annular rings rests, the step defining a junction between top and bottom slot sections, the projections having a flange or skirt that separates an upward extending projection section from a downward extending projection section, the threaded collars threadably engaging the internal thread of the annular rings and bearing against a facing surface of the flange or skirt to releasably connect the projections within the annular rings, the upward extending section of the projections extending at least partly through the collars and the annular rings and into releasable connection with the fixing members.

15. A screening apparatus according to claim 13, wherein each of the bottom slot section and the downward extending section of the projection has a bottom surface, whereby the bottom surface of the downward extending section seats on the bottom surface of the bottom slot section.

16. A screening apparatus according to claim 13, wherein the flange or skirt is an annular flange or skirt.

17. A screening apparatus according to claim 13, wherein the downward extending section of the projection includes an abutment for abutting a proximate surface of the screening apparatus and for preventing rotation of the projection.

18. A screening apparatus according to claim 7, further including threaded collars which threadably engage the internal thread of the annular rings and which engage the projections to releasably connect the projections within the annular rings.

* * * * *

UNITED STATES PATENT AND TRADEMARK OFFICE
CERTIFICATE OF CORRECTION

PATENT NO. : 9,795,992 B2
APPLICATION NO. : 14/944631
DATED : October 24, 2017
INVENTOR(S) : Marc Raymond Woodgate et al.

It is certified that error appears in the above-identified patent and that said Letters Patent is hereby corrected as shown below:

In the Claims

Column 10, Line 39: Replace "claim 13" with "claim 14."

Column 10, Line 44: Replace "claim 13" with "claim 14."

Column 10, Line 46: Replace "claim 13" with "claim 14."

Signed and Sealed this
Twelfth Day of April, 2022

Drew Hirshfeld
*Performing the Functions and Duties of the
Under Secretary of Commerce for Intellectual Property and
Director of the United States Patent and Trademark Office*